MEMORY SEARCH APPARATUS

Filed Nov. 24, 1959

INVENTOR
ARTHUR V. POHM

BY
Cushman, Darby & Cushman
ATTORNEYS

United States Patent Office 3,076,958
Patented Feb. 5, 1963

3,076,958
MEMORY SEARCH APPARATUS

Arthur V. Pohm, Ames, Iowa, assignor to Sperry Rand Corporation, New York, N.Y., a corporation of Delaware Filed Nov. 24, 1959, Ser. No. 855,221
10 Claims. (Cl. 340—174)

Figure 2:
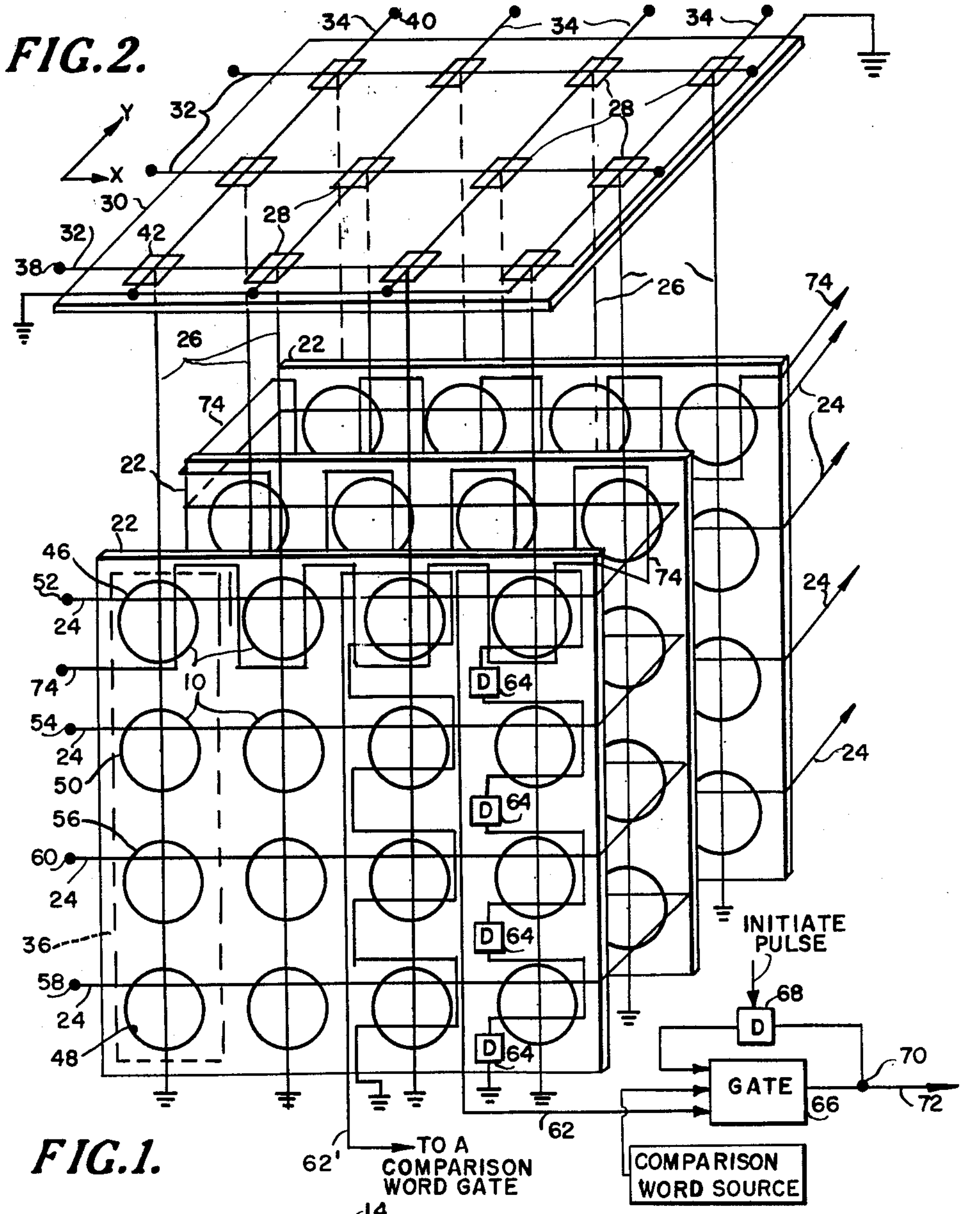

This invention relates generally to magnetic information storage apparatus for digital data processing apparatus and more specifically to a magnetic memory which can be more readily searched in order to determine the presence or absence of a given word or portion thereof.

In many applications of digital data processing equipment, such as in inventory control and related problems, it is necessary to search the contents of the memory for the presence of a given word or register of information, for example, a stock or part number. The search is made on the basis of equality to a known identifier rather than by addressing a known memory location.

In conventional magnetic memories the problem of determining whether a given word is contained therein is both complex and time consuming. The chief reason for this is that in order to read out a word from the memory it becomes necessary to interrogate each memory register in a sequential manner, until the desired group of information is found.

In this invention the memory is so organized that entire words may be written into it at random and read out in a random-access fashion, preferably in a non-destructive manner. In addition, a so-called "search sense" winding is provided for each word linking all the digits in that word. In one example, delay elements are interposed along each search sense line which present a one-digit period delay between each of the successive storage elements linked by that line. Thus, the outputs from the memory elements which are induced in each search line when the memory registers are interrogated are separated in time as the signals emerge from said lines. This allows an entire memory register to be linked by a single search energizing line, or as it may be conveniently termed, the interrogate drive line. Conventional serial logic may then be used at the outputs of the search sense lines to determine if the desired word is in the catalogue.

The method most readily adaptable to the search technique of this invention and used as an illustration herein, is the method of producing a reversible rotation of the magnetization of the magnetic element and detecting the relative polarity of the resulting output signal. Such is one of several techniques which have been proposed for obtained a non-destructive readout of information from ferro-magnetic storage elements. However, it is apparent that other means of attaining a readout signal may be incorporated in a search memory in accordance with the ideas presented in the present application. It is therefore not my intention to limit my invention to a search memory which utilizes the particular sensing technique which is described hereinbelow for purposes of illustration. Also, since means for obtaining non-destructive readout from toroidal cores is also relatively well known in the art, it is not my intention to limit my invention to a search memory having thin ferromagnetic films as the memory storage elements, this type being used herein only for purposes of illustration.

It is accordingly the object of the present invention to provide a means for rapidly searching a memory to determine the presence or absence of a given word or group of information.

Another object of this invention is to provide a coincident current random-access memory which, in addition, has the rapid search feature as described in the foregoing object.

Still another object of the present invention is to provide a means for rapid access whereby a memory can be searched for a given word by imposing delay elements between adjacent memory elements in a sense line through a word register to serialize the output from said line, so that said output can be compared one digit at a time for equality to the digits of the word being sought.

Yet another object of this invention is to provide a means for rapid access to the contents of a magnetic memory whereby the presence or absence of a given word may be determined by sequentially energizing the interrogate lines associated with each memory plane, thereby eliminating the need for the delay elements mentioned in the above object.

Figure 1:
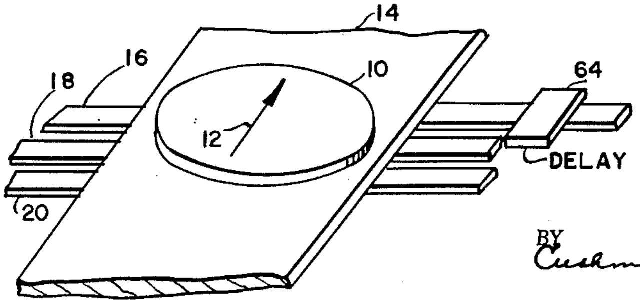

The foregoing objects, advantages, construction and operation of the present invention will become more readily apparent to those skilled in the art from the following description of an illustrative embodiment of the invention, which may be best understood by reference to the accompanying drawings, in which:

FIGURE 1 illustrates one bit or memory cell location of a complete word line, to aid in understanding of FIGURE 2 which illustrates the manner in which a plurality of memory cells may be arranged in a memory so as to allow a rapid search in accordance with the invention.

Referring now to FIGURE 1, it may be seen that in accordance with the present invention, one bit or memory cell of a complete memory word register may comprise at least one thin ferromagnetic film 10 located in an inductive relationship with a plurality of current conducting members arranged in a predetermined manner with respect to the so-called "easy" axis 12 of film 10. As is completely described in Rubens Patent 2,900,282, film 10 may be of the type prepared by the vacuum deposition on a substrata of a suitable magnetic alloy in the presence of an orienting magnetic field. The current conducting members associated therewith may be conductors prepared by using relatively well known printed circuit techniques. Conducting member 14 which may be termed the search interrogate line (for reasons which will become apparent from the following discussion) is oriented in a substantially parallel relationship with the easy axis 12 of film 10. Located transverse to interrogate line 14 is an additional conducting member 16 termed the search sense line. It is in this line that voltage signals are induced during the non-destructive interrogation of the information content of the magnetic element 10. In addition to the current conducting lines already described, an additional winding 18, termed the write drive line, is also included. Its function, as its name implies, is to alter the binary information contained in selected memory cell locations, i.e., to write information into selected memory cells. Winding 20, termed the sense/inhibit line, is included in the preferred embodiment of this invention so as to provide a means for conventional coincident current address interrogation which should be distinguished from the search type interrogation. The placement and use of conductors relative to thin film is detailed in the copending application of Rubens et al., Serial No. 626,945, filed December 7, 1956, now Patent No. 3,030,612.

For the non-destructive readout from magnetic film elements, the anisotropy energy of the film can be used in conjunction with applied external fields to bring about reversible rotation of the film magnetization, see the copending application of Rossing et al., Serial No. 658,258, filed May 10, 1957. In this process, the saturation magnetization vector is originally parallel to the easy axis of magnetization, or at an angle $\theta=0°$ which corresponds to the minimum of the energy potential well $E_K=K_1 \sin^2 \theta$. The magnetization is then rotated, by means of an external drive field $H_T$ applied transverse to the film's easy axis, to some angle $\theta$. When the drive field $H_T$ is removed, the angle of the magnetization vector again returns to 0 degree provided the rotational limit has not been exceeded. The temporary or reversible rotation of the magnetization causes a change in the flux linking a suitably arranged sense line and induces therein a signal of one polarity when the film is in its "0" state and of the opposite polarity when the film is in its "1" state.

Since winding 14 is the means employed to impress the transverse field $H_T$, and this field, in effect, asks the film in which of its two stable states it is magnetized, winding 14 is termed the interrogate winding. The search sense line 16 is oriented substantially transverse to the easy axis 12 of film 10 so as to detect the component of the change in flux parallel to the easy axis for it is this component of flux which carries the desired information.

The write drive line 18, when current is made to flow therethrough, produces a field which is used to switch the film from one of its two stable states to its opposite state. During the write cycle a small transverse field is applied by means of winding 14 in conjunction with the longitudinal field (produced by current flowing in winding 18) in order to switch the film by domain rotation which is considerably faster than by simple wall-motion switching. The concept of rotational switching is fully explained in the afore-referenced Rubens et al. application and it is thought unnecessary that it be explained further in the present application.

FIGURE 2 illustrates the manner in which the memory cells of FIGURE 1 are arranged to form a three-dimensional magnetic memory for digital computing machines having provisions for a rapid search. A plurality of thin film elements 10 are arranged on a number of word register planes 22. In FIGURE 2 each word register plane contains four registers having a storage capacity of four digits per register. A given word register is made up of a single column of film elements having four rows. It should be understood that it is not intended to limit the invention to an embodiment having only twelve registers of four bits each, since it is well within the bounds of ordinary skill in the art to enlarge or reduce the size of the search memory of this invention by merely including or excluding additional word registers or extending or decreasing the storage capacity of each register.

A write winding such as 24 in FIGURE 2 is oriented so as to inductively link each bit occupying the same digit position on a given plane. There is a separate write winding for each bit in a word register. Writing of information into the memory is done on a word basis rather than on a digit by digit basis. As mentioned before, to change the state of a given memory cell both a longitudinal and a transverse field are required. The write line 24 is the means employed to provide the required longitudinal field. The transverse field used for writing in a word-organized memory is supplied by means of a current flowing through the word drive/interrogate lines 26. There is one drive/interrogate line for each word in the memory, and it inductively links all the memory cell locations or digits in a given word register.

To select one particular word for writing or interrogation, use is made of a plurality of so-called word-selection gates 28 arranged in a matrix 30. There is one gate for each word in the memory. The inputs to the word-selection gates 26 are a set of conventional X and Y drive lines 32 and 34 respectively. An input to one X drive line and one Y drive line causes an output to be emitted from the particular gate 28 located at their intersection. The output pulse is therefore applied to one and only one drive/interrogate line 26. The simultaneous application of a current to a selected word drive/interrogate line 26 and to one or more write lines 24 causes the magnetic elements located at the intersection of the activated drive and write lines to be set to the states corresponding to the information on the write lines. For example, suppose the binary word 1001 is originally stored in the word register enclosed by dashed line 36 and it is desired to write the new word 1010 in this particular register. In order to apply the required transverse field to all films in the selected register, a pair of simultaneous (coincident current) pulses are applied to X drive line terminal 38 and Y drive line terminal 40. As a result of these two pulses, an output current pulse will be emitted from word-selection gate 42 only, and from there via its drive/interrogate line 26 to all bit positions in word register 36. If the word stored in register 36 is considered to have its least significant digit stored in the top film 10 and its most significant digit in the bottommost film 10, then the only films whose information content is to be changed are the upper and next to upper films 10, i.e., the magnetization of the upper film is to be changed from a state indicating a binary "1" to a state indicating a binary "0" whereas the opposite is true for film next down. In accordance with the principles of reversible rotation, the transverse field produced by current flowing through the drive line 26 causes the magnetization of all films associated with this line to be rotated by some angle $\theta$ away from their axes. At the same time that this transverse field is in effect, a longitudinal field of the proper direction is generated by applying current of a predetermined polarity to the write drive line terminals 52 and 54. The effect of the combined longitudinal field and transverse field acting on film 46 is to rotate the magnetization of this film past its reversible limit so that when the fields are removed, the film will be magnetized in its arbitrarily defined "0" state. Similarly the effect of the combined fields on film 50 is to switch said film to its "1" state. Since films 48 and 56 are to remain unaltered, no current is applied to their respective write drive lines 58 and 60 during the time that the transverse field is in effect, hence, these two films are not switched.

In order to perform a rapid search of the memory of FIGURE 2, an additional winding such as 62 is provided for each word in the memory, as a sense line common to all the bits of the word or register. For clarity, only one such winding is shown. Winding 62 is the same as winding 16 in FIGURE 1. Between cell locations in each word are included delay elements 64. Delay elements, as such, are relatively well known in the art. In fact, it has been found that deposited film elements offer a certain fixed delay to the transmission of electrical impulses. Hence, in accordance with a preferred embodiment of this invention, delay elements 64 may also be deposited magnetic film elements prepared in much the same manner as the memory elements 10.

The search of the memory is effected by applying an interrogating field to every cell location in the memory via the drive/interrogate lines 26. This is accomplished by simultaneously energizing all of the X and Y drive lines 32 and 34 respectively. This interrogate field causes the magnetization of the memory elements to temporarily rotate as has been previously described and thus produce an output of one polarity or the other from each film, said polarity being dependent on the information stored in the films as represented by its remanent state. Because of the delay elements 64, the output signals induced in the search sense line 62 are separated in time and sent serially, i.e., digit by digit to one input of a receiving means in the form of comparison gate 66. One such gate is provided for each word register in the memory array. At the same time, the word being sought is shifted serially from an external register, which may be called the comparison word storage register (not shown), one digit at a time, and forms the second input to the comparison gate 66. Also included in the comparison logic is a feedback path which also provides a one digit delay 68 identical to the delay produced by elements 64. The feedback connection from the output terminal 70 to the third input of gate 66 provides for proper timing as well as for pulse shaping.

At the same time that the interrogate pulse is applied to the films of all the word registers in question, an initiating pulse is applied to gate 66 via delay element 68. The delay involved is such that the signal induced in the search sense winding indicative of the information stored in the lowest order bit position arrives at the input of the comparison gate simultaneously with the initiating pulse. Now, if the induced signal being compared is identical polaritywise to the signal corresponding to the lowest order digit of the word being sought which has been shifted from the comparison word register, an output results from gate 66 on line 72.

After a delay equal to the delay of element 64, a signal of a polarity indicative of the state of the second lowest order cell position of the word stored in the word register under consideration which has been induced in the sense line arrives at the input of gate 66. Since the delay of element 68 is equal to the delay of element 64, the output pulse from the gate 66 caused by the preceding comparison arrives at the input of gate 66 precisely at the same time that the signal from the sense line 62 arrives. Now if the polarity of the second digit is the same as the polarity of the second digit of the word being sought, the "AND" condition of gate 66 will again be satisfied and another output pulse will result on line 72.

However, if the digit arriving at the input of gate 66 from sense line 62 is not idenitcal in polarity to the digit arriving from the comparison word register, no output will appear on line 72. When the next pair of pulses to be compared arrive at the input of gate 66 they will be unable to pass since no enabling signal will be fed back through delay element 68 to the third input of gate 66. The comparison operation therefore ceases and it is then known that the information being sought is not contained in this particular word register.

If the word being sought corresponds digit by digit to the word contained in a particular memory word register, the complete desired word is delivered to an external computer register or registers for further operations thereon.

As an example of the operation of the search memory, suppose the word being sought is represented by the binary number 1010 and the word contained in a particular memory register under consideration is 1110. Further assume that the interrogate pulse causes those memory cells 10 storing a binary "0" to induce a signal of negative polarity on the search sense line 62 and to induce a positive polarity signal thereon when they store a binary "1." A pair of coincident current pulses are applied to all of the X drive lines 32 and the Y drive lines 34 at the same time. As a result an interrogate pulse passes through all of the selection gates 28 to all of the interrogate lines 26. At the same time, a search-initiating pulse is applied to the delay element 68 of all of the serial comparison logic circuits. Since as assumed in the example, the contents of the lowest order digit position is a "0" the interrogate pulse causes a negative polarity pulse to be induced on sense line 62 and impressed on one input of gate 66. Also, since the lowest order digit of the word being sought is also "0" a negative polarity pulse is shifted from the comparison word register and impressed on a second input to comparison gate 66. Because of the built-in time delay, the initiate pulse arrives at the third input to gate 66 at exactly the same time as the inputs from sense line 62 and the comparison word register. Since gating conditions are satisfied, an output appears on line 72.

The interrogate pulse on line 26 causes a positive signal to be induced on sense line 62 due to the interrogation of the second lowest order bit. This positive pulse is delayed by element 64 for one digit period and hence arrives at the input of gate 66 at the same time that the fed-back output from gate 66 produced by the previous (lowest order) comparison arrives at its input via delay element 68. Since the input from the comparison word register is also a positive polarity pulse, a second output results from gate 66. This output is again fed back through delay element 68 and arrives simultaneously with the positive pulse produced by the third lowest order bit which had been delayed by two digit periods. However, since the pulse supplied by the comparison register is negative in polarity, the gating condition for gate 66 is no longer satisfied and hence no output appears on line 72. With no output on line 72, no enabling signal is fed back through delay 68 to the input of gate 66. Therefore, even though the signal induced on sense line 62 by the highest order bit is of the same polarity as the signal shifted to gate 66 from comparison word resigter, no output will result from gate 66. Only if the word being sought corresponds digit by digit to a word contained in a memory register will a complete word be sent to an external computer register for further processing.

In the event that it is desired to eliminate the delay elements 64 from the search memory of this invention, additional means must be required to provide a sequential output on the search sense lines 62. One method of serializing the non-destructive outputs from the thin film storage elements is to sequentially apply an interrogate field to all films in the memory having the same degree of significance. A means for so doing is also shown in FIGURE 2, where a plurality of interrogate lines 74 are included. Winding 74 inductively links each film in the memory occupying the least significant digit position in each word register. For the sake of clarity in the drawing, only one such winding is shown. However, it should be understood that for proper operation of the search memory a winding oriented identically to winding 74 is required for each digit position in a word register. With these windings included, the delay elements 64 can be removed from the system, as illustrated by sense line 62' in FIGURE 2. The rapid search of a complete memory of this type would be accomplished by sequentially energizing the interrogate windings 74 with a current pulse from the least significant to the most significant digit position at a fixed and predetermined rate. As a result, the output signals induced in the sense lines 62' will be separated in time and hence may be applied to a gate such as gate 66 one digit at a time in coincidence with the signals shifted out of the comparison word register in the same manner as previously described in regard to gate 66 and reference characters 68 and 70.

Other modifications of this invention will become apparent to those of ordinary skill in the art after reading this disclosure. Therefore, it is intended that the matter contained in the foregoing description and accompanying drawings be interpreted as illustrative and not limitive, the scope of the invention being defined in the appended claims.

What is claimed is:

1. In a memory register circuit, a sense line common to the several bits of the register, means for exciting the respective bits of the register for generation thereby of signals in said sense line, means for receiving said signals from said sense line, means for sequentially transmitting said sense line signals to said receiving means, a source of sequential signals representing a given series of data bits, the receiving means including means for comparing the signals from said sense line and said source for coincidence.

2. A circuit as in claim 1 wherein said means for sequentially transmitting sense signals includes at least one time delay means between at least one memory bit and said receiving means.

3. A circuit as in claim 1 wherein said means for sequentially transmitting sense signals includes means for exciting the respective bits of the register sequentially.

4. A plural register memory circuit comprising two or more register circuits as in claim 1, wherein the means for sequentially transmitting sense signals of each register to its receiving means includes means for concurrently exciting all of the memory bits of the same significance in all of the registers as a group, and in sequence so exciting the other groups of bits of differing significance.

5. A circuit as in claim 1 wherein the means for exciting the register bits is arranged to excite all of the bits concurrently.

6. A circuit as in claim 2 wherein the means for exciting the register bits is arranged to excite all of the bits concurrently.

7. In a memory register circuit comprising a plurality of bit positions, each bit position including a thin film type magnetc data storage device, means including conductors inductively coupled thereto for establishing digital binary data in said register bit positions, a further conductor inductively coupled to all of the bits of the register constituting a sense line, means for exciting the respective bits for generation thereby of signals in said sense line in accordance with data stored in the respective bits, means for receiving said signals from said sense line, the circuit including means for sequentially transmitting said sense line signals to said receiving means, a separate source of sequential signals representing a given series of data digits, the receiving means including means for comparing the signals from said sense line and source for coincidence.

8. A circuit as in claim 7 wherein said means for sequentially transmitting sense signals includes at least one time delay means between at least one memory bit and said receiving means.

9. A circuit as in claim 7 wherein said means for sequentially transmitting sense signals includes means for exciting the respective bits of the register sequentially.

10. A plural register memory circuit comprising two or more register circuits as in claim 7, wherein the means for sequentially transmitting sense signals of each register to its receiving means includes means for concurrently exciting all of the memory bits of the same significance in all of the registers as a group, and in sequence so exciting the other groups of bits of differing significance.

References Cited in the file of this patent

UNITED STATES PATENTS

| | | |
|---|---|---|
| 2,800,596 | Bolie | July 23, 1957 |
| 2,911,631 | Warren | Nov. 3, 1959 |
| 2,915,740 | Ricketts | Dec. 1, 1959 |
| 2,928,080 | Auerbach | Mar. 8, 1960 |